(12) United States Patent
Xhafa et al.

(10) Patent No.: US 10,080,054 B2
(45) Date of Patent: Sep. 18, 2018

(54) AUTOMATIC TIME EXTENSION OF PROGRAM RECORDING

(71) Applicant: TEXAS INSTRUMENTS INCORPORATED, Dallas, TX (US)

(72) Inventors: Ariton E. Xhafa, Plano, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 598 days.

(21) Appl. No.: 14/254,535

(22) Filed: Apr. 16, 2014

(65) Prior Publication Data
US 2015/0281778 A1    Oct. 1, 2015

Related U.S. Application Data

(60) Provisional application No. 61/816,352, filed on Apr. 26, 2013.

(51) Int. Cl.
| | |
|---|---|
| *H04N 21/458* | (2011.01) |
| *H04N 21/44* | (2011.01) |
| *H04N 21/439* | (2011.01) |
| *H04N 21/4147* | (2011.01) |
| *H04N 21/472* | (2011.01) |
| *H04N 21/433* | (2011.01) |
| *H04N 21/2187* | (2011.01) |

(52) U.S. Cl.
CPC ..... *H04N 21/4583* (2013.01); *H04N 21/2187* (2013.01); *H04N 21/4147* (2013.01); *H04N 21/4334* (2013.01); *H04N 21/4394* (2013.01); *H04N 21/44008* (2013.01); *H04N 21/47217* (2013.01)

(58) Field of Classification Search
CPC .......... H04N 21/2187; H04N 21/4147; H04N 21/4394; H04N 21/44008; H04N 21/4583; H04N 21/47217
See application file for complete search history.

(56) References Cited

U.S. PATENT DOCUMENTS

| | | | |
|---|---|---|---|
| 2008/0163306 A1* | 7/2008 | Sonoda | H04N 5/44543 725/58 |
| 2010/0104257 A1* | 4/2010 | Broberg | H04N 5/76 386/291 |
| 2010/0162305 A1 | 6/2010 | Downey et al. | |
| 2011/0103774 A1 | 5/2011 | Howarter et al. | |

(Continued)

FOREIGN PATENT DOCUMENTS

| | | | | |
|---|---|---|---|---|
| JP | 2006148714 A | * | 6/2006 | H04N 5/76 |

*Primary Examiner* — Gelek W Topgyal
(74) *Attorney, Agent, or Firm* — Michelle F. Murray; Charles A. Brill; Frank D. Cimino (57) ABSTRACT

A system (and method) automatically extends a scheduled recording of a live event past its scheduled end time. The system include includes a content interface to receive program content. The system also includes a user interface to permit a user to schedule a user-selected program content for recording. The user-selected program content has a scheduled start time and a scheduled end time. A program content analyzer may detect a pattern in the user-selected program content. A recording unit may record the user-selected program content and automatically extend the recording past the scheduled end time based on whether the pattern is detected.

5 Claims, 5 Drawing Sheets

(56) References Cited

U.S. PATENT DOCUMENTS

2011/0311205 A1* 12/2011 McClanahan .......... H04N 5/782
386/296
2012/0099795 A1* 4/2012 Jojic .................... G06K 9/3266
382/199
2014/0029918 A1 1/2014 Bumgardner et al.

* cited by examiner

AUTOMATIC TIME EXTENSION OF PROGRAM RECORDING

CROSS-REFERENCE TO RELATED APPLICATION

The present application claims priority to U.S. Provisional Patent Application No. 61/816,352, filed on Apr. 26, 2013 titled "Systems and Methods to Record Live Events in Digital Video Recording Devices," which is hereby incorporated by reference.

BACKGROUND

Digital video recorders (DVRs) are widely used today. A user can cause the DVR to record program content so that the user can watch the recorded content at a later time of the user's choosing. Broadcast content providers (e.g., satellite service providers, cable service, providers, etc.) often include a programming guide that can be accessible by a user via a remote control. The programming guide specifies which programs are to be broadcast on the various channels and the start and end times for each such program.

Sports and other live events are shown at different times of the day, depending on where the sport or other live event is taking place. For example, soccer matches are shown at different times of the day in different countries. People that are not able to watch the event live may use a DVR device to record the event for subsequent viewing at their convenience.

However, for a live event such as a sporting event, overtime is possible. The end of the live event thus is not predictable and could run beyond the end of the time listed in the programming guide. For example, a sporting event scheduled to end at 6 pm might go longer than 6 pm because the game was tied at the end of regulation and went into overtime. If the live event runs beyond the time it was scheduled to end, the DVR will stop recording prematurely (i.e., at the end time listed by the programming guide) and thus will not record the end of the game. Hence, the end of the game, typically the most exciting part of the live event is missed, which results in frustration by the viewer.

SUMMARY

Various systems and methods for automatically time extending a recording of a live event are disclosed herein. In accordance with at least some embodiments, a system (e.g., a DVR) detects a pattern in the program content being recorded at or near the scheduled end of recording time. Based on the detected pattern, the system may automatically extend the recording past the scheduled end time for the event. In one embodiment, the detected pattern is a video pattern such as the score being displayed or the venue itself. If the score is determined to be tied near or at the scheduled end time, the recording is automatically extended to ensure that that the entire event is successfully recorded. Other patterns are disclosed as well (e.g., audio patterns) to determine whether to extend the recording.

In some embodiments, a system automatically extends a scheduled recording of a live event past its scheduled end time. The system include includes a content interface to receive program content. The system also includes a user interface to permit a user to schedule a user-selected program content for recording. The user-selected program content has a scheduled start time and a scheduled end time. A program content analyzer may detect a pattern in the user-selected program content. A recording unit may record the user-selected program content and automatically extend the recording past the scheduled end time based on whether the pattern is detected.

In another embodiment, a non-transitory, computer-readable storage device contains instructions that, when executed by a processor, cause the processor to: select a program content for recording. The selected program content has a scheduled start time and a scheduled end time. The instructions further cause the processor to start recording the selected program content at the scheduled start time, detect whether a particular pattern exists in the program content, and automatically extend the recording past the scheduled end time based on whether the particular pattern is detected.

In yet another embodiment, a method includes detecting a start time of a scheduled program content previously selected for recording, initiating recording of the scheduled program content, and analyzing the scheduled program content being recorded to detect whether a particular pattern is present in the scheduled program content. If the particular pattern is not present, the method includes stopping the recording at an end time of the scheduled program content. If, however, the particular pattern is present, the method includes extending the recording past the end time.

In another embodiment, a system includes an interface to receive program content and status information about the program content over a network. The system also includes a user interface to permit a user to schedule a program content for recording. The user-scheduled program content has a scheduled start time and a scheduled end time. A recording unit is included to record the user-selected program content and, based on status information of the program content being recorded received over the network, to automatically extend the recording past the scheduled end time.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The embodiments disclosed herein are directed to recording a live event (e.g., a live sporting event) that has a scheduled start time and a scheduled end time. A decision is made whether to automatically extend the recording of the live event past the scheduled end time in order to ensure that the entire live event is recorded. These embodiments are useful for live events which, for whatever reason, may complete after the scheduled end time. For example, a sporting event may go into overtime and thus continue through the scheduled end time. In accordance with some embodiments, a system (e.g., a DVR) detects a particular video or audio pattern in the program content being recorded and extends the recording past the scheduled end time on the basis of whether the pattern is detected.

A video pattern may include such patterns as the score being displayed for a sporting event or the venue of the sporting event. If the score is being displayed, the DVR preferably determines whether the score is tied at or near the scheduled end time and if the score is tied, automatically extends the recording. If the venue (e.g., football field, baseball park, etc.) remains present in the program content just after the scheduled end time, recording may be automatically extended.

An audio pattern may include the voice of the commentator of the live event. The DVR may have speech pattern recognition capability and may use that capability to determine if the same commentator is still speaking after the scheduled end time. If the commentator is still speaking, the recording is automatically extended.

In another embodiment, the DVR may access a network to retrieve the score for the sporting event being recorded. If the score is tied at or just before the scheduled end time for the event, the recording may be automatically extended until the DVR determines, through the network access, that the sporting event has concluded.

As used herein, the term "program content" refers to a broadcast program that is to be recorded. The content may be a show, a movie, a sporting event, etc. In general, the disclosed embodiments apply to program content containing live events as opposed to prerecorded events) that conceivably may extend past their scheduled end time due to unforeseen events. The program content may be received by the disclosed system via any suitable type of communication medium such as cable, satellite, network (e.g., the Internet), etc. Examples of sporting events are provided below, but the disclosed principles apply to non-sporting events as well.

Figure 1A:
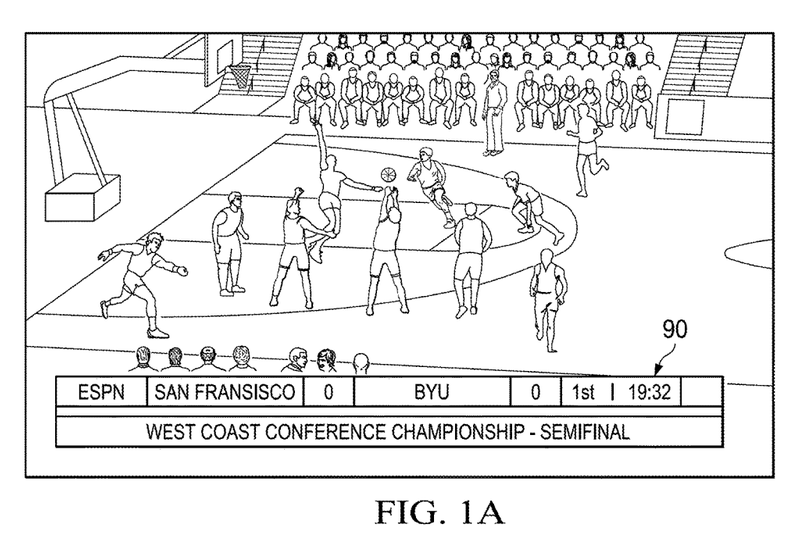
FIGS. 1A-1C show examples of screen shots of live program content being recorded.
Figure 1B:
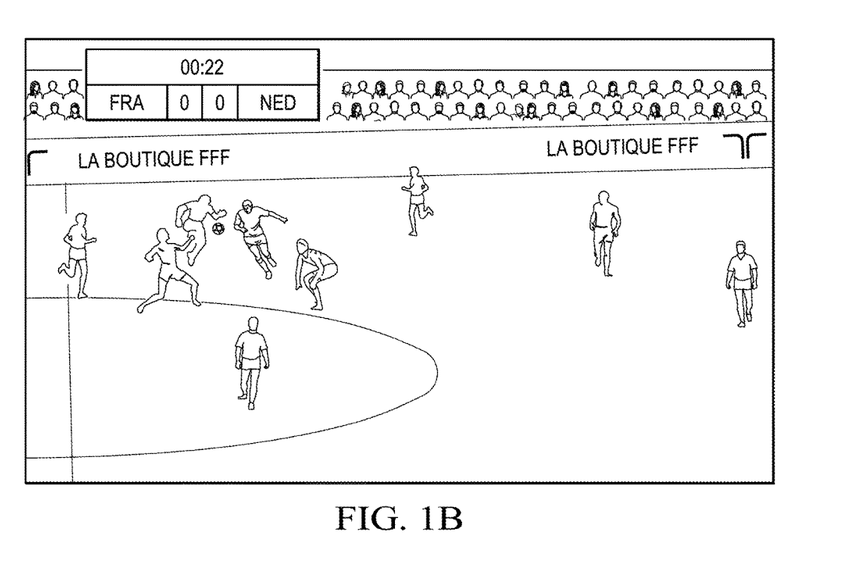
Figure 1C:
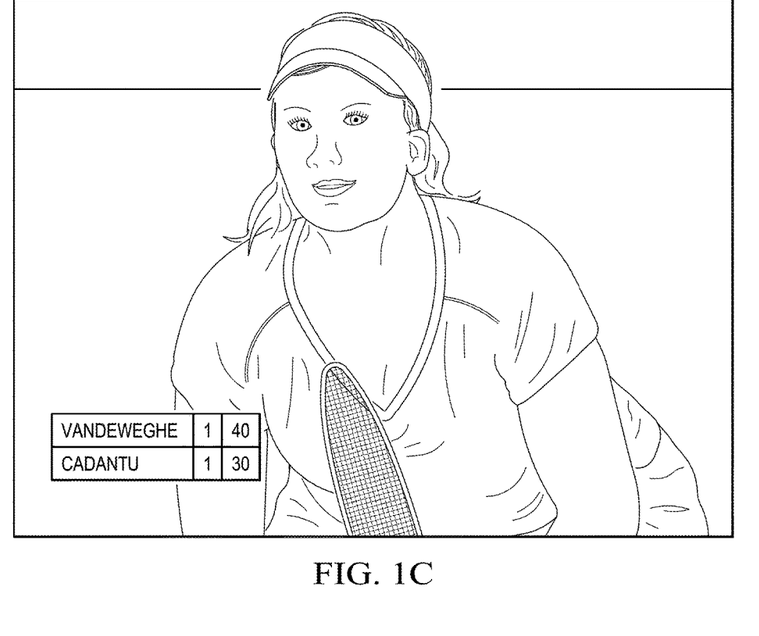

FIGS. 1A-1C illustrate screen shots of live sporting events. FIG. 1A shows a basketball, while FIGS. 1B and 1C show soccer and tennis matches, respectively. The score field 90 in FIG. 1A is displayed near the bottom of the screen when the program content is being shown. The score, however, may be displayed at any suitable location on the screen (top, bottom, sides, etc.). Typically, however, the location for the score remains the same throughout the broadcast. The score field 90 may include an identification of the competitors such as team names, abbreviations, logos, etc., the score for each competitor, as well as other information such as time remaining for the event, the period or quarter, etc. The competitors may include individuals (e.g., for a tennis match) as well as teams for team events. The score field 90 in the example of FIG. 1 shows that the basketball game is tied at 0-0 between San Francisco and BYU, and that there is 19:32 remaining in the first half. The screen shot in the example of FIG. 1 shows a portion of the basketball court with various basketball players on the court, players and coaches on the sideline, and fans in attendance in the stands.

In the example of FIG. 1B, the score of the soccer game is near the top of the screen and closer to the left side than the right side. The score in this game is also tied. FIG. 1C shows the score (also tied at one set each) of a tennis match near the bottom of the screen in a different format than in FIG. 1A. The score for each player is to the right of that player's name and the names are displayed vertically (one name on top of the other), while the team names in FIG. 1A are arranged horizontally as shown.

Figure 2:
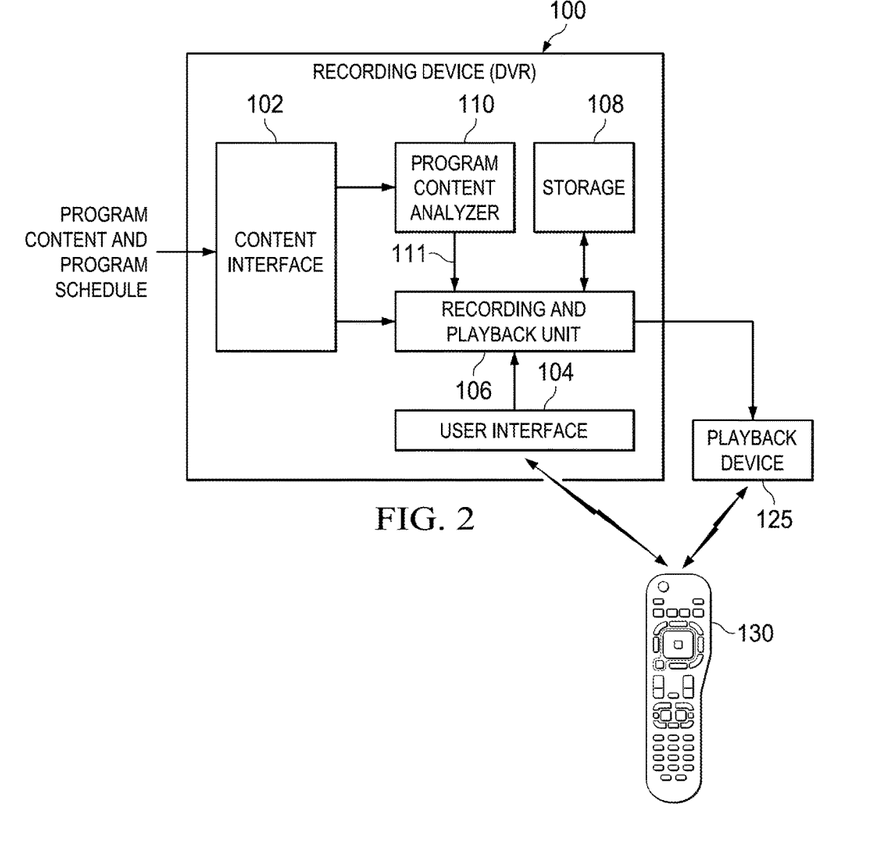
FIG. 2 shows a block diagram of system including a recording device in accordance with various embodiments.

FIG. 2 shows an example of a system including a recording device 100 coupled to a playback device 125 and operable by a user via a remote control 130. The remote control 130 may be a standalone wireless remote control device or a smart phone or other type computing device with wireless capability. The recording device 100 is broadly referred to herein as a digital video recorder (DVR) and may be implemented as a broadcast receiver (e.g., satellite receiver, cable receiver, etc.) with DVR capability, a DVR capability included in a computer, etc. The playback device 125 may be a television, computer display, or other type of playback device. The remote control 130 preferably is a wireless remote and may be usable to control both the DVR 100 and the playback device 125.

The example DVR architecture of FIG. 1 includes a content interface 102, a user interface 104, a recording and playback unit 106, non-volatile storage 108, and a program content analyzer 110. In some embodiments, these components may be separate components but in other embodiments, two or more of the components may be combined together into one component.

The content interface 102 preferably receives program content and a program schedule. The program schedule includes data that can be displayed on the playback device 125 (e.g., by pressing a "guide" button on the remote control 130) to permit a user to see what program content is or will be broadcast on the various channels at various points in time. The program schedule may provide program content information for one or more days into the future (e.g., a week into the future).

The user interface 104 may be a wired or wireless interface to receive signals from the remote control 130. For example, the user interface 104 may be implemented as a radio frequency (RF) or infrared (IR) receiver to receive RF or IR wireless signals from the remote control 130.

By pressing the guide button (or equivalent) on the remote control 130, the user interface 104 may cause the recording and playback unit 106 to display the program schedule on the playback device 125. Using the remote control 130, the user can then scroll through the displayed program schedule and select specific program content (e.g., a sporting event) to record. The program schedule includes a scheduled start time and a scheduled end time. For example, a particular sporting event may start at 3 pm on a particular date and end at 6 pm.

The recording and playback unit 106 preferably begins the recording of the user-selected program content at the corresponding start time and, unless the recording is extended, stops the recording at the scheduled end time. In the example above, the recording will start at 3 pm on the scheduled day and stop at 6 pm. The recorded program content is stored in storage 108 and can then be retrieved at a later time, as dictated by a user via remote control 130, for playback by the recording and playback unit 106 on the playback device 125.

The program content being recorded may be a live or a prerecorded program. As explained above, live content may extend past the scheduled end time. In accordance with the preferred embodiments, the DVR 100 analyzes the content being recorded to determine if the recording of the program content should be extended. The program content analyzer 110 preferably performs this function by, for example, analyzing the program content itself to detect the presence of a particular pattern in the content. The pattern may be a video pattern and/or an audio pattern.

Figure 3:
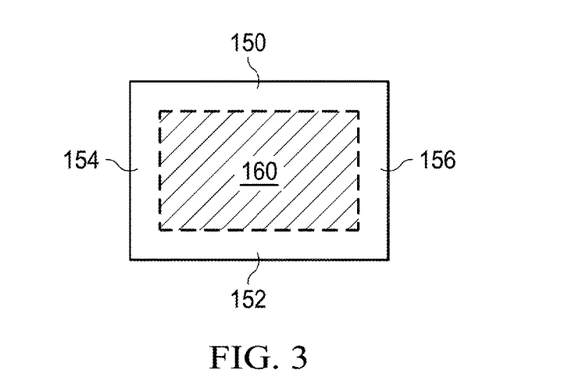
FIG. 3 shows locations in displayed content where a score is typically displayed.

Referring again to FIG. 1, a sporting event may be characterized by the inclusion of the score on the game being broadcast. The score typically remains at the same location (e.g., top center of the image) throughout the event. The program content analyzer 110 examines the recorded images to perform pattern recognition to thereby detect the presence of a displayed score. The program content analyzer 110 can narrow its field of search for a visual pattern that includes a score by limiting its analysis, as illustrated in FIG. 3, to only the top band 150, bottom band 152 or side bands 154 and 156 of the displayed image. Scores typically are not displayed in the central portion 160 of the image and thus central potion 160 need not be analyzed by the program content analyzer 110. The sizes of the top, bottom and side bands 150-156 can be preconfigured or may be adjustable as desired, but generally are large enough to ensure that the score for all types of sporting events are likely to be captured in the analysis by the program content analyzer 110.

The format for the scores for different sporting events is different; however, within the same sporting event the scores tend to follow the same format. For example, the format for the soccer games may have the time elapsed for the game on the top of the score format and the score may be placed between the two team names. The system can take snapshots of the images where it the score may be displayed (e.g., top, bottom, or side sections of the display). The area for the team names in the score generally will not change over time; hence, the correlation of the area containing the team name will be very high. In addition, since the team names are given in letters, pattern matching can be used to further confirm that these are indeed the team names. The score is given in numbers and it will have distinct color from the background on which it is displayed and the scores for the teams may also be separated by a hyphen (-). Hence, the system can perform a pattern matching analysis in which it matches the score displayed with the numbers. The time pattern format is also known: minutes are separated from the seconds with a semicolon pattern. Therefore, knowing where the score might be, the correlation pattern for the team names, as well as distinct features for the score and the time displayed for the sporting event, the system identifies the score location, the score, and the time elapsed for the live event.

The program content analyzer 110 may periodically examine an image from the program content being recorded. The periodicity of the examination may be preconfigured or programmable. Suitable examples include once every 30 seconds, once every one minute, etc. The program content may include 30 frames per second. All 30 frames every second need not be analyzed as scores in a sporting event do not change that quickly. In some implementations, the program content analyzer 110 may begin trying to detect the visual pattern at the beginning of the recording, while in other embodiments, the program content analyzer 110 may not begin its analysis until within a particular time period from the end of the scheduled end time. For example, the program content analyzer 110 may begin its analysis within 10 minutes of the scheduled end time.

Within another predetermined time period before the scheduled end time (e.g., one minute before the scheduled end time), if the program content analyzer 110 detects the pattern of a score and determines the score to be tied, the program content analyzer 110 asserts a signal 111 (FIG. 2) to cause the recording and playback unit 106 to automatically extend the recording past the scheduled end time. The recording may be extended for a specific amount of time (e.g., one hour) past the scheduled end time. Alternatively, the recording may be extended until the program content analyzer 110 determines that the score is no longer tied, or for a specific amount time (e.g., 30 minutes, one hour) after determining the score is no longer tied.

The content interface 102 may also provide a network interface 100 to enable the DVR 100 to access a network (e.g., the Internet). The network can be used to determine which competitors are competing in the currently recorded program content. For example, the DVR 100 (e.g., by the recording and playback unit 106) knows that it is recording program content at a certain time and date and on a certain channel. The program content analyzer 110 can use that information to access an online service to determine the nature of the content. For example, the program content analyzer 110 may determine that the content being recorded from 3 pm to 6 pm on a certain date and a certain channel is, based on an access to an on-line service, a football game between the Houston Texans and the New York Jets. The identity of the two competitors can be used by the program content analyzer 110 during its analysis process to detect the visual pattern containing the score. For example, the program content analyzer 110 may perform pattern recognition to examine the content for a displayed "Houston Texans," "HOU", and the like. Upon detecting the identity of the two competitors in a visual pattern around the periphery of the content, any detected numbers next to the competitors' identity may be considered to be the score.

Some sporting events (e.g., soccer games) may extend into overtime even if one team wins the game. For example, if two soccer teams split the current and previous games with each team winning a game and the scores of the two games are the same (2-1 in one game with one team winning and 2-1 in the next game with the other team winning), the second game may extend into overtime. The program content analyzer 110 performs a network access to determine the score of the previous game and asserts the signal 111 to cause the recording and playback unit 106 to extend its recording accordingly (e.g., for a finite amount of time, until the score is determined to no longer be tied, for a finite amount of time after the score is no longer tied, etc.).

Referring again to FIG. 1, the program content analyzer 110 may also determine whether to extend the recording past the scheduled end time based on a determination that a venue persists in the content being recorded just past the scheduled end time. In this embodiment, the recording may automatically be extended if the program content analyzer 110 determines that a sporting event is being recorded and that the same venue exists before and after the scheduled end time. For example, during the recording the program content analyzer 110 may detect the presence of a visual pattern containing a score and also performs a pattern recognition of the recorded content. The recording may be extended for a predetermined period of time (e.g., 5 minutes) past the scheduled end time in order to ascertain whether a visual pattern containing the same venue persists in the recorded content after the scheduled end time. For example, the program content analyzer 110 may compare the image shown to known patterns, such as a football field, tennis court, basketball court, etc. These patterns are somewhat unique. For example, a soccer field includes grass (generally green), a series of white lines crossing the field from side to side, two goals, etc. A basketball court is a different color (e.g., light brown), has a center line, side and end lines, and each end of the court a rectangular shape representing the "paint" and a "circle" defining the top of the key. The program content analyzer 110 can also compare the images obtained at a later time with those that show the field during the playing time. In this approach, correlation between the images can serve as the indicator to decide if the recording needs to be extended. Thus, the program content analyzer 110 may analyze the video pattern before the scheduled end time, extend the recording past the scheduled end time, analyze the video pattern after the scheduled end time, and extend the recording even further past the scheduled end time based on a determination that the video pattern continues to show the same venue after the scheduled end time. The recording may be extended for a predetermined period of time (e.g., 30 minutes) after no longer detecting the same venue. The venue may include the field of play, sidelines, stands, etc.

In the embodiments provided above, the recording of the program content is extended past its scheduled end time based on a detection of a particular visual pattern (tied score or persistent venue). In other embodiments, the detected pattern may be an audio pattern. For example, for a live sporting event, a commentator continually comments on the event as the game progresses. The program content analyzer 110 may perform a suitable speech recognition process to detect the presence of a commentator's voice. The event's recording may be automatically extended by a predetermined time period (e.g., 5 minutes), and if the program content analyzer 110 detects the presence of the same voice during that extended period of time, the program content analyzer 110 determines that the live event did not end before the scheduled end time and extends the recording even further.

In some embodiments, the recording may be further extended (i.e., beyond the initial 5 minute time period) for a further predetermined time period (e.g., 30 minutes) with the audio of the recorded program content again analyzed near, at, or just after the extended 30 minute time period. If the same voice is still detected at that time, the recording is extended even further (e.g., another 30 minute time period) with the process repeating itself.

In other embodiments, the recording is extended until more than a predetermined time period (e.g., 5 minutes) has elapsed without the program content analyzer 110 detecting the same commentator's voice.

Figure 4:
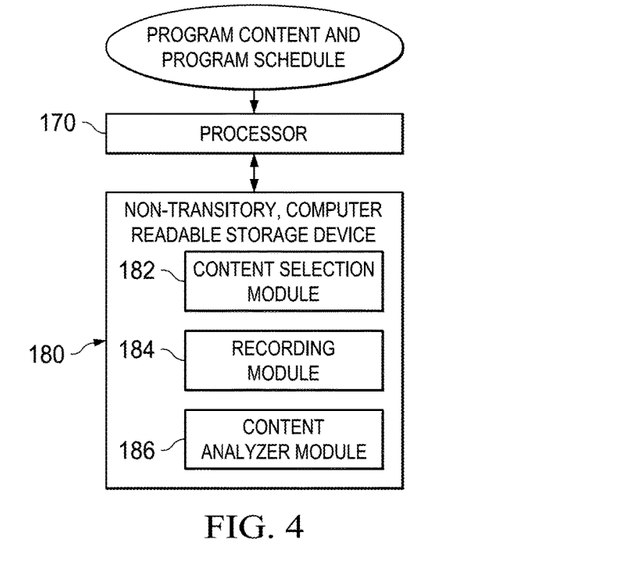
FIG. 4 shows a block diagram of the recording device of FIG. 2 in accordance with another embodiment.

FIG. 4 shows an illustrative implementation of the DVR 100 of FIG. 2. As shown, the system may include a hardware processor 170 coupled to a non-transitory, computer-readable storage device 180. The storage device 180 may include volatile storage such as random access memory (RAM) or non-volatile storage such as a hard drive, flash storage, optical disk, etc. The storage device 180 includes various software modules 182, 184, and 186 that are executable by the processor 170 to impart some or all of the functionality attributed herein to the DVR 100. The functionality described below as attributed the various software modules is implemented by the processor 170 executing each such software module. The combination of the processor 170 executing a particular module is referred to as an engine. Thus, a content selection engine is the combination of the processor 170 and the content selection module 182. Similarly, the recording and content analyzer engines are the combination of the processor 170 and the respective recording module 184 and content analyzer module 186.

The content selection module 182 permits a user to select one or more program content broadcasts from, for example, the program schedule to be recorded. This module may cause the program schedule to be displayed on the playback device 125 and enable the user to scroll the list of displayed program content using the remote control 130 and to select a particular highlighted program content for recording.

The recording module 184 determines when a start time has occurred that corresponds to any of the program content selected for recording. When such a start time occurs, the recording module 184 causes that particular program content to be recorded and stored to storage 108 or 180. The recording module 184 may also extend the recording time past the scheduled end time upon receipt of a command from the content analyzer module 186.

The content analyzer module 186 determines whether the recording should be extended as described herein.

Figure 5:
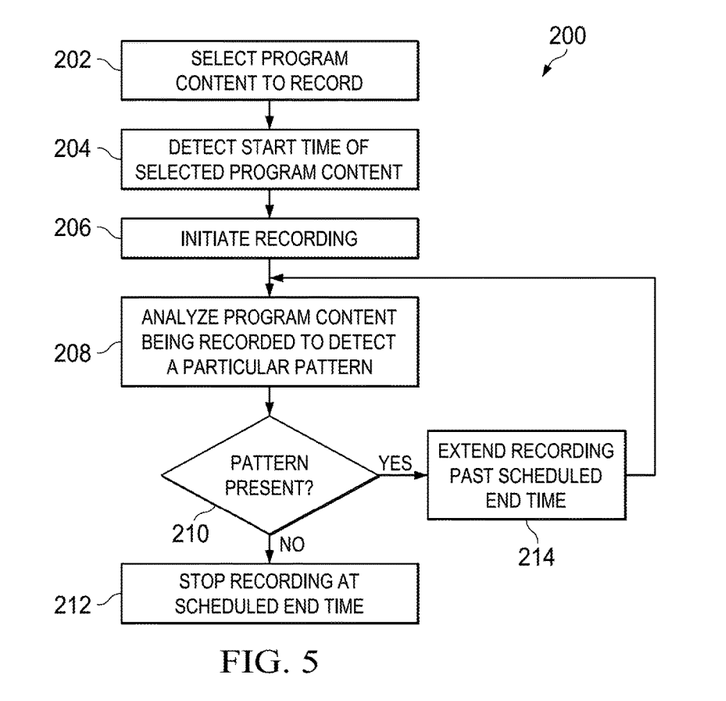
FIG. 5 shows a method in accordance with an embodiment.

FIG. 5 illustrates a method in accordance with various embodiments. At 202, the method includes selecting program to record. The user may cause this operation to happen using the remote control 130 to select a particular program content from a program schedule as described above.

At 204, the method includes detecting the start time of the selected program content and the recording thus initiates at 206. At 208, the program content being recorded is analyzed to detect a particular pattern. For example, the particular pattern detected may be a visual or audio pattern. The visual pattern may include the score (a tied score causing the recording to be extended) or the venue of the sporting event. The audio pattern may include a commentator's voice. This operation may be performed by the program content analyzer 110 as described herein.

If the particular pattern is detected at 210, the program content analyzer 110 causes the recording and playback unit 106 to extend (at 214) the recording past the scheduled end time as described herein. If the scheduled end time is automatically extended, control may loop back to 208 for further consideration as to whether the recording should be extended even further. However, if the particular pattern is not detected, then at 212, the recording is permitted to stop at the scheduled end time.

In accordance with another embodiment, the DVR 100 (e.g., the recording and playback unit 106) access a network through, for example, the content interface 102 to determine which sporting event is being recorded as described above, and to ascertain the live score of the sporting event. In this embodiment, the recording and playback unit 106 automatically extends the recording past the scheduled end time until a periodic network access ascertains that the game has in fact ended. In some embodiments, the on-line service providing score updates to the DVR 100 may "push" event messages to DVR 100. One such message may indicate whether the game is completed, and the DVR 100 continues to record the game until it receives a message that the game is over.

Figure 6:
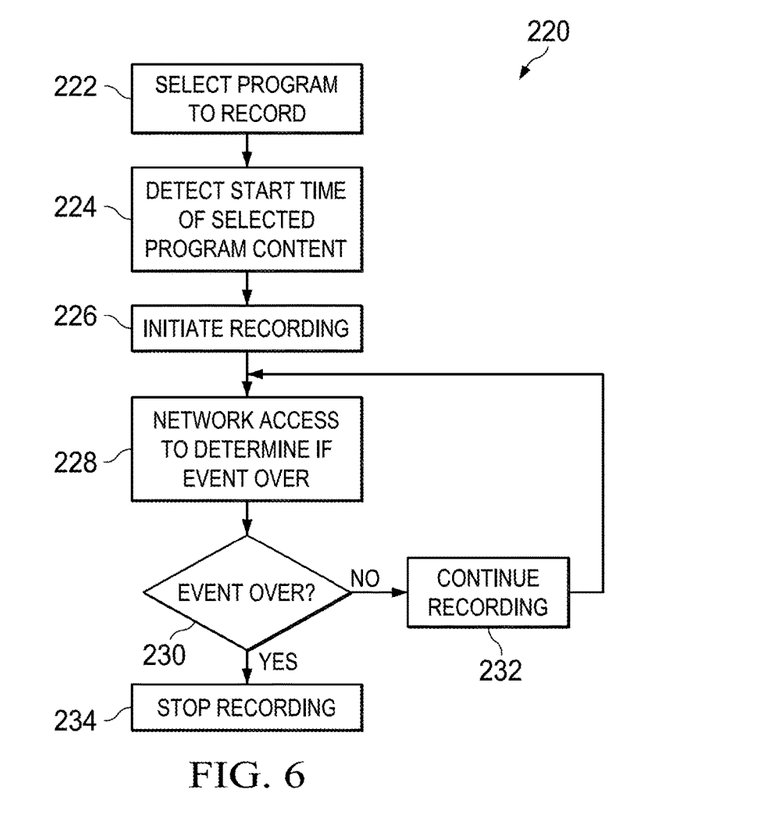
FIG. 6 shows a method in accordance with yet another embodiment.

FIG. 6 illustrates a corresponding method 220. Operations 222-226 may be the same as corresponding operations 202-206 in FIG. 5 and further discussion is thus omitted here. At 228, the method 220 includes performing a network access to determine if the event is over. Status information (e.g., the score) may be retrieved to during the network access to make this determination. If the event is over (230), control continues to operation 234 at which time the recording is stopped. However, if the event is not over, then the recording is continued at 232 and control loops back to operation 228 at which the DVR 100 again performs a network access to determine if the event is over.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a content interface to receive program content;
a user interface to permit a user to schedule a user-selected program content for recording, the user-selected program content having a scheduled start time and a scheduled end time;
a program content analyzer to detect a video pattern in the user-selected program content, wherein the video pattern includes a score of a live sporting event, wherein the program content analyzer determines whether the score is tied; and
a recording unit to record the user-selected program content and to automatically extend the recording past the scheduled end time based on the detected video pattern, wherein the live sporting event is between a plurality of competitors and the system includes a network interface to access a network to determine a score of a previous sporting event between the competitors and the program content analyzer is to extend the recording past the scheduled end time based on the score of the live sporting event being recorded and the score of the previous sporting event.

2. A system, comprising:
a content interface to receive program content;
a user interface to permit a user to schedule a user-selected program content for recording, the user-selected program content having a scheduled start time and a scheduled end time;
a program content analyzer to detect a video pattern in the user-selected program content; and
a recording unit to record the user-selected program content and to automatically extend the recording past the scheduled end time based on the detected video pattern, wherein the video pattern is of a venue of a live sporting event, and wherein the program content analyzer:
analyzes the video pattern before the scheduled end time;
extends the recording past the scheduled end time;
analyzes the video pattern after the scheduled end time; and
extends the recording even further past the scheduled end time based on a determination that the video pattern continues to show the same venue after the scheduled end time.

3. A non-transitory, computer-readable storage device containing instructions that, when executed by a processor, cause the processor to:
select a program content for recording, the selected program content having a scheduled start time and a scheduled end time;
start recording the selected program content at the scheduled start time;
detect whether a particular video pattern exists in the program content, whether the video pattern includes a score of a live sporting event, and wherein the instructions cause the processor to determine whether the score is tied; and
automatically extend the recording past the scheduled end time based on the detected video pattern, wherein the live sporting event is between a plurality of competitors and the instructions cause the processor to access a network to determine a score of a previous sporting event between the competitors, and the instructions further cause the processor to extend the recording past the scheduled end time based on the score of the live sporting event being recorded and the score of the previous sporting event.

4. A non-transitory, computer-readable storage device containing instructions that, when executed by a processor, cause the processor to:
select a program content for recording, the selected program content having a scheduled start time and a scheduled end time;
start recording the selected program content at the scheduled start time;
detect whether a particular video pattern exists in the program content; and
automatically extend the recording past the scheduled end time based on the detected video pattern, wherein the video pattern is of a venue of a live sporting event, and wherein the instructions cause the processor to:
analyze the video pattern before the scheduled end time;
extend the recording past the scheduled end time;
analyze the video pattern after he scheduled end time; and
extend the recording even further past the scheduled end time based on a determination that the video pattern continues to show the same venue after the scheduled end time.

5. A method, comprising:
detecting a start time of a scheduled program content previously selected for recording;
initiating recording of the scheduled program content;
analyzing the scheduled program content being recorded to detect whether a particular pattern is present in the scheduled program content;
if the particular pattern is not present, stopping the recording at an end time of the scheduled program content; and
if the particular pattern is present, extending the recording past the end time, the particular pattern is at least one of a speech pattern and video pattern, wherein the particular pattern is a venue of a live event and the recording is extended past the end time based on the venue being detected in the scheduled program content after the end time.

* * * * *